United States Patent [19]

Muylle et al.

[11] 4,398,814
[45] Aug. 16, 1983

[54] CASSETTE FOR HOLDING AND DISPENSING A ROLL OF WEB MATERIAL

[75] Inventors: Wilfried E. Muylle, Schoten; Edward Buelens, Kontich, both of Belgium

[73] Assignee: Agfa-Gevaert N.V., Mortsel, Belgium

[21] Appl. No.: 328,627

[22] Filed: Dec. 8, 1981

[30] Foreign Application Priority Data

Jun. 23, 1981 [GB] United Kingdom ................ 8119360

[51] Int. Cl.³ ............................................. G03B 17/26
[52] U.S. Cl. .................................. 354/275; 242/71.1; 242/75.4
[58] Field of Search ............. 354/275; 242/71.1, 75.4, 242/197, 55.53; 206/316, 387; 352/72, 70 R

[56] References Cited

U.S. PATENT DOCUMENTS 3,613,876 10/1971 Kohler et al. ................ 242/71.1 X
3,784,001 1/1974 Bushnell et al. ............... 242/71.1 X Primary Examiner—John Gonzales
Attorney, Agent, or Firm—William J. Daniel

[57] ABSTRACT

A cassette for holding and rotatably dispensing a roll of web material carried on a rotatable roll is provided with a locking member connecting between the rotatable roll and the cassette body and having a cross-sectionally reduced zone that may be ruptured by rotation of the roll incidental to the initial withdrawal of the web material from the cassette, the reduced zone having at least one inner sub-zone of lesser rupture resistance than the outer sub-zones on each side thereof, e.g., an aperture whereby the reduced zone ruptures upon rotation of the roll through a lesser angle than in the absence of the sub-zone.

7 Claims, 6 Drawing Figures

CASSETTE FOR HOLDING AND DISPENSING A ROLL OF WEB MATERIAL

The present invention relates to a cassette for holding and dispensing a roll of web material.

The invention is particularly suitable for embodiment in a cassette for holding and dispensing a roll of unexposed light-sensitive material for use in phototypesetting apparatus, in semi-automatic process cameras, for instance for handling diffusion transfer material in a daylight environment, etc.

A roll of photographic material can be secured against undesired rotation by means of a locking member that co-operates with the core and with a wall of the cassette and has a weakened zone which can be ruptured by the torsional force applied to the locking member when the user starts pulling the material from the cassette. It is very advantageous to provide a locking member having one end portion located in and frictionally clamped or gripped by the core of the roll and its other end portion in engagement with the hub portion of one end wall of the cassette (as described and claimed in United Kingdom patent application No. 8039456 filed Dec. 9, 1980).

The form of locking member shown by way of example in said earlier patent application may require in practice to be twisted through about 360° C. before its weakened zone ruptured, so unlocking the core. The length of material which has to be pulled from the cassette before the locking member ruptures may in some circumstances be wasted. This will usually be the case with light-sensitive photographic material which has to be pulled out into a day-light environment or wound onto a take-up spool before any frame of the material is image-wise exposed. The amount of material which is thus wasted will depend upon the size of the roll. For rolls of relatively small sizes, for example rolls having a diameter of 9 cm and containing 45 m of light-sensitive material, the amount of waste may be considered negligible, but it is otherwise in the case of relatively large rolls. For example in the case of a roll of photographic material containing about 60 m of photographic material of about 0.3 m in width, the roll diameter being 14 cm, an appreciable amount of the material, ranging from 60 to 80 cm in length, would require to be pulled from the cassette in order to rupture the locking member and so unlock the film roll.

The example of a locking member described in detail in said earlier patent application comprises a piece of material having a weakened zone of reduced width. The width reduction is responsible for the weakening. It would be possible locally to reduce the width of the member to such an extent that it can be ruptured by relatively twisting the end portions of the member through much less than 360° but the inherent strength of the member would then be insufficient for the purposes mainly in view.

The present invention provides further embodiments of the invention which is the subject of said earlier patent application. In these embodiments the locking member has a form which enables adequate inherent strength for normal handling purposes to be combined with a relatively low resistance to rupture under torsion.

According to the present invention there is provided a cassette for holding and dispensing a roll of web material would onto a tubelike core, said cassette being in the form of a box comprising a tubular shell and two end walls having central hub portions for rotatably supporting said core within the box, the shell having a peripheral exit slot through which the material can be drawn from a said roll, and a locking member for preventing rotation of the core prior to the first use of the cassette, such member comprising a weakened zone which is between two end portions and which can be ruptured by the action of the initial drawing out of the web material from the cassette, characterised in that one of said end portions of said locking member is located in and frictionally engaged by the core of the roll, and the other end portion is in engagement with the hub portion of one end wall of said box so as thereby to prevent rotation of the core and in that rupture resistance of the locking member varies across the width of said weakened zone, (i.e. across its dimension running normally to the longitudinal axis of such member), there being within such width at least one inner sub-zone where the rupture resistance is negligible relative to the rupture resistance in each of two sub-zones between which that inner sub-zone is located.

As in the case of the cassettes described in said earlier patent application, the locking member is preferably formed in one piece and this is preferably a piece of metal. For example the locking member may be stamped from a sheet of aluminium or aluminium alloy.

In preferred embodiments of the invention there is at least one hole in the weakened zone of the locking member, the or each such hole creating a said inner sub-zone which is of nil rupture resistance. An alternative way of carrying out the invention is to form the locking member so that within the weakened zone there is at least one inner sub-zone where the material of the member is thinner than in the sub-zones between which it lies. This form of locking member could e.g. be formed as a one-piece plastics moulding.

It is preferred to provide a single said inner sub-zone of nil or relatively negligible shear resistance, such sub-zone being centrally located within the width of the weakened zone. However the invention includes embodiments wherein there are two or more such inner sub-zones located in line across the width of the locking member at the weakened zone.

Preferably the weakened zone is a zone which not only has at least one said inner sub-zone, but which is also of reduced width relative to both end portions of the locking member. In that case the width reduction and the said sub-zone(s) contribute to the weakening of the locking member.

Preferably the or each said inner sub-zone in the locking member has three or more boundary edges defining three or more corner angles. A said inner sub-zone with sharp boundary angles promotes ease of rupture. It is very suitable for the inner sub-zone to be of generally triangular or diamond shape. It is particularly advantageous for there to be a said sub-zone whose maximum across-zone dimension is between opposed boundary corners and for these corners to be located on a notional line normal to the longitudinal axis of the locking member.

When a locking member having a weakened zone with an inner sub-zone of nil or negligible shear resistance is ruptured by torsional force, the torque does not cause the member to become smoothly torn into two pieces. The shearing resistance changes abruptly during the twisting of the member. It has been found that the shearing gives rise to an audible sound or "click" which is useful because it signals to the user that the cassette roll is unlocked and that helps to ensure that no more material is pulled from the roll than is necessary for that purpose.

The invention is particularly suited for use in a cassette as claimed in GB P 1,546,068 relating to a light-tight cassette, and in EU Patent Publication 0,016,488 which also relates to a light-tight cassette, both patent rights being assigned to the same assignee as the present application. However, it will be understood that the invention is not limited to these particular cassettes, as will become apparent from the description hereinafter.

The invention will hereinafter be described by way of example with reference to the accompanying drawings wherein.

Figure 1:
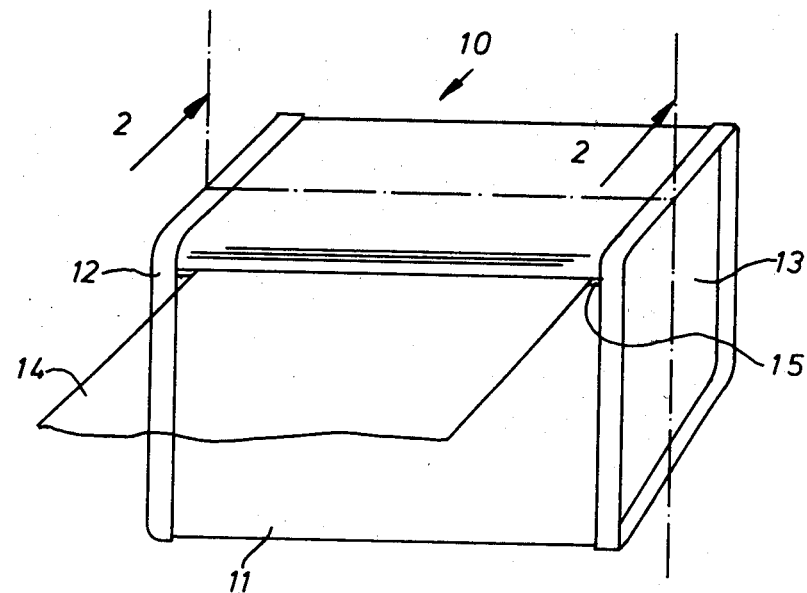
FIG. 1 is a perspective view of one embodiment of a cassette according to the invention.

Referring to FIG. 1, a rectanguloid cassette 10 for holding a roll of light-sensitive photographic material comprises a shell portion 11 and two end caps 12 and 13. A web 14 of photographic material may be drawn from the cassette through a light-tight exit slot 15 that extends between the end caps over the full length of the shell portion and that may be situated close to a corner portion of the shell. The photographic material has been illustrated as being transparent in the figure. The shell portion of the cassette may be manufactured from plastic or paperboard whereas the end caps may preferably be made from plastic by injection-molding or by thermo-vacuum forming.

Figure 2:
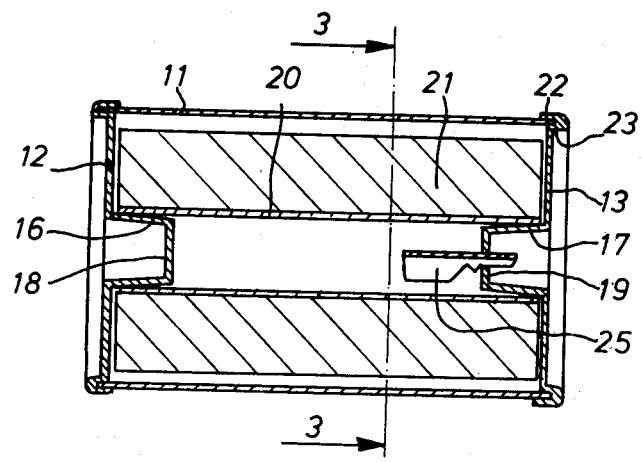
FIG. 2 is a vertical section according to the plane indicated by the line 2—2 of FIG. 1.

FIG. 2 illustrates a vertical longitudinal cross-section of the cassette on line 2—2 of FIG. 1. The end caps have central hub portions 16, 17 that may be formed by central portions upset from the wall of the caps terminating in circular walls 18 and 19. The hub portions have a slightly conical form and they rotatably support a hollow core 20 onto which a roll 21 of the light-sensitive web 14 is wound. The core is a tubular body that is suitably made from paperboard or plastic.

The end caps 12 and 13 may have inner and outer peripheral wall portions, such as the portions 22 and 23 illustrated for the cap 13, defining a peripheral groove for receiving an end of the shell 11. The fixing of the end caps to the shell may occur by glueing, by taping, or even by stitching as disclosed in EU Publication 0,016,488 mentioned hereinbefore. The end caps may further be provided with radial ribs for increasing the rigidity of the caps, and with corner guide portions with sloping flanks for facilitating the assembling of the shell and the end caps, all as known in the art.

The locking member for locking the core 20 against undesired rotation in the cassette is the member 25 that extends from the core 20 into a slot in the circular wall 19 of the hub portion 17. The form of the locking member 25 is difficult to recognize in FIG. 2, since the member has been cut half away by the section according to the plane 2—2 of FIG. 1 and, moreover it is situated in a plane that is at an angle of 45° with respect to the faces of the shell 11. The form and the operation of the locking member are better understood by the illustration of FIG. 4 which is a partially enlarged sectional view on line 4—4 of FIG. 3 where also the slot 26 in the hub portion 17 is clearly visible.

Figure 4:
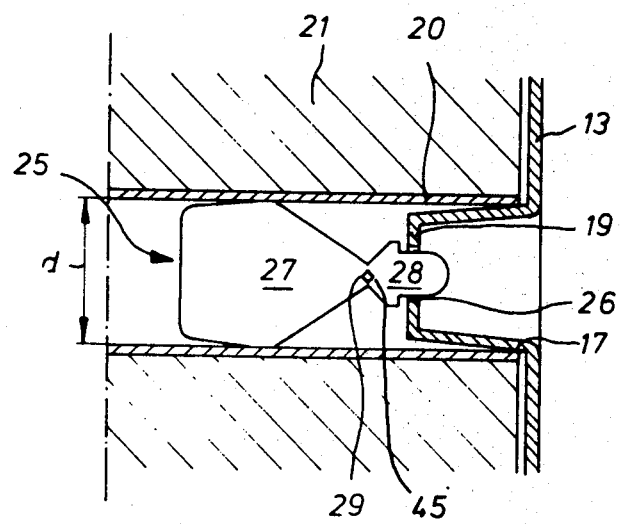
FIG. 4 is an enlarged detail view of a section on line 4—4 of FIG. 3, of the locked end portion of the core of the cassette.

Referring to FIG. 4, the locking member 25 is a flat piece of material having a first end portion 27 that is clamped by the core 20, and a second end portion 28 that engages in the slot 26. Those end portions are interconnected by a zone 29 of reduced width. Centrally of the zone 29, there is an inner sub-zone in the form of an opening 45 with a diamond-like shape, between two outer sub-zones 46 and 47.

Details of said locking member are as follows, with reference to FIGS. 5 and 6. The end portion 27 has a greatest width a at a position 30, a slightly less width b at a position 31, and a still less width c near the rear side 32, whereby said end portion has in fact slightly convexly curved side edges. The width a slightly exceeds the inner diameter d of the core 20, and the width b is slightly smaller than said diameter d. The purpose of said difference in widths is as follows. The width a is such as to ensure the frictional clamping of the member 25 by the core 20 to such an extent that rotation of said member in the core under the influence of forces applied to the end portion 28 is impossible. Said clamping is, however, not so tight as to prevent the locking member from being axially displaced along the core, as is required when the locking member is inserted into its illustrated position. The insertion of the member may occur in a simple way by means of a slotted cylindrical tool, not illustrated, wherein the end portion 28 of the member is temporarily clamped, and by means of which the member 25 is slid into the core 20 preparatory to the assembling of the cassette. At this stage, the roll 21 is preferably already wound on the core. A collar or the like on the tool may determine the depth of insertion of the tool in the core so that a reproducible position of the member 25 in the axial direction of the core is attained.

A further consideration in connection with the dimension a is that the clamping force should not be such as to cause any significant deformation of the tubular core. Such deformation might cause pressure-sensitizing of light-sensitive material on the core, and it might also impede the smooth radiation of the core on the cassette hub portions. The mutual inclination of the lateral side edges 33 and 34 of the locking member between the positions 31 and 32 facilitates the introduction of the locking member into the core. The inclination of said side edges between the positions 31 and 30 is smaller than between 31 and 32, and suffices to localize the gripping zone between the positions 31 and 30. Thus, although the side edges between 31 and 30 are in contact with the inner wall of the core, the point of maximum pressure is located at the position 30, so that the member is capable of undergoing a pivotal or tilting movement about an axis that coincides approximately with the dimension a, which results in a displacement of the end portion 28 of the member in the sense indicated by arrow 35 illustrated in FIG. 6. This freedom for pivotal movement facilitates the engagement of the end portion 28 in the slot 26 of the end cap 13, upon the assembling of the cassette. Any possible small misalignment of the member in a direction parallel with the longer side of the slot is self-correcting because the curved end edge 36 has a limited centering effect on the member when assembling the cassette.

The length l of the parallel side walls 42, 43 of the end portion 28 of the member 25 is such as to allow slight tolerances in the engagement of the end portion 28 with the slot 26, in the axial direction of the cassette.

The strength of the cross-sectionally reduced zone 29 must be such that the locking member is not ruptured by forces exerted by the roll 21 during transport, handling, etc., of the cassette, but yet may be readily sheared by the twisting force imposed on the initial withdrawal of web from the cassette by the operator. The force that is required for the unlocking of the roll should be greater than the frictional resistance to rotation of the roll on the hub portions 16 and 17, but should preferably be smaller than the pulling force which would cause a constricting of the roll windings.

A further condition for the satisfactory operation of the locking system is that the friction of the roll 21 on the core 20 is sufficient to produce the couple that is required to shear the locking member. If the winding characteristics of the roll on the core are such that reliance cannot be placed on the frictional engagement of the core by the innermost convolution of the roll, then such convolution should be fixed to the core for instance by the use of adhesive or by spot-welding of a thermoplastic layer on the core.

Figure 3:
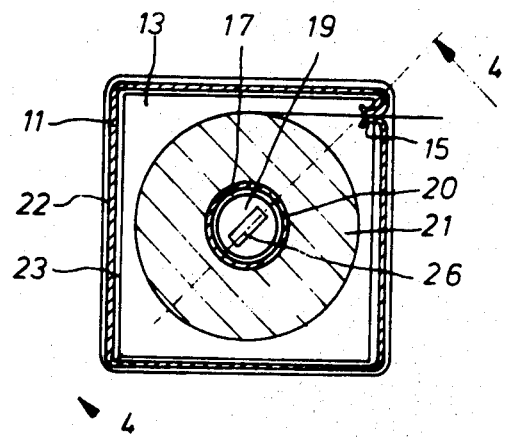
FIG. 3 is a vertical cross-section on line 3—3 of FIG. 2, the locking member being removed.

The purpose of the location of the slot 26 at an angle of 45°, as illustrated in FIG. 3, is to avoid that the end portion 28 would ever exert an excessive pressure on an end of such slot. Suchlike situation might happen if the member 25 had been misaligned in the core whereby the end portion 28, considered according to the position of FIG. 4, would be located lower than the illustrated position, so that it could strongly bear on an end of the slot in the case of a vertically oriented slot. The described disposition of the slot at 45° avoids a vertical orientation of the slot at all stacking positions wherein two side walls of the shell are horizontal and the two other side walls are vertical.

The effect of the opening 45 in the cross-sectionally reduced zone 29 is as follows. As the web 14 is initially pulled out of the cassette, the core 20 is rotated whereby the end 27 of the locking member 25 is angularly displaced with respect to the end 28. The neck portion 29 is twisted and this causes at a given moment the shearing of the material in those parts of the neck which are most remote from the longitudinal axis of the member, namely in the outer sub-zones 46 and 47. This shearing prognoses towards the axis of the member, but as it does so the greater becomes the tendency of the material to twist instead of to shear. The completion of rupture occurs abruptly and tends to be easily audible. A similar result can be achieved if the locking member is made so that the inner sub-zone 45, instead of being a hole, is an area of material whose resistance to rupture under torque is so small that it does not significantly contribute to the rupture resistance of the locking member.

As mentioned already, the shape of the inner sub-zone 45 is preferably such that as to promote rupture with a minimum of twisting motion. This feature is obtained by angles, preferably sharp, at the point of greatest diameter of the opening 45, measured radially with respect to the longitudinal axis of the member. The illustrated diamond-like form of the opening 45 is only one embodiment; other forms being a triangle, a rhombus, etc.

The following data relate to an example of a cassette with a locking member according to the invention.

Figure 5:
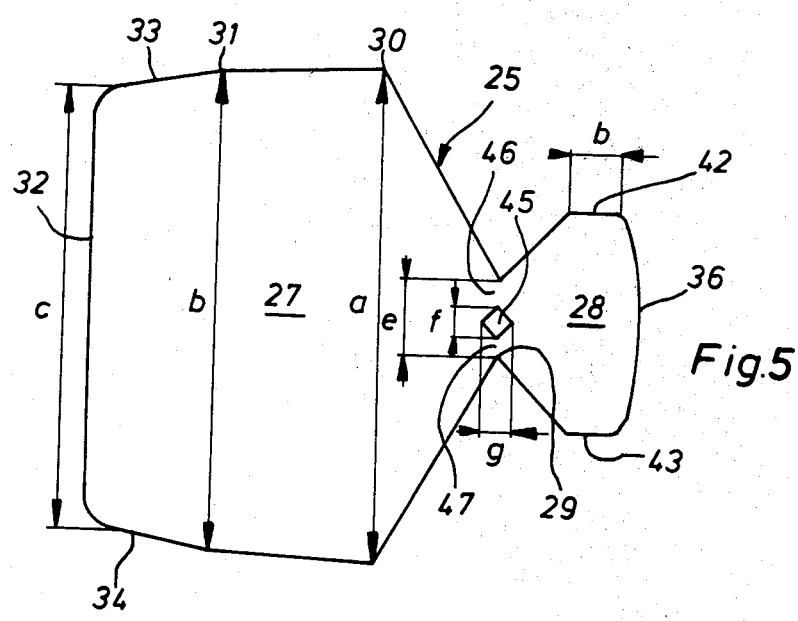
FIG. 5 is an enlarged plan view of one embodiment of a locking member.
Figure 6:
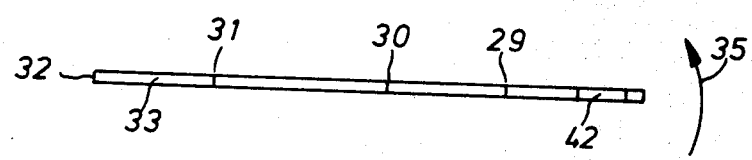
FIG. 6 is a side view of this embodiment.

Core 20:
 paperboard with a wall thickness of: 2 mm
 length: 12 inches
Roll 21: light-sensitive photographic paper, light-sensitive layer wound at outerside of roll
 length of the roll: 200 ft
 width of the roll: 12 inches
Locking member 25: shape as illustrated in FIGS. 5 and 6.
Made by stamping from a sheet of aluminium with a thickness of 1.2 mm.
 Dimension a: 78 mm
 Dimension b: 76.6 m
 Dimension c: 60 mm
 Width e of the neck portion 29: 12 mm
 Dimension f of the opening 45: 5 mm
 Dimension g of the opening 45: 5 mm.

The normal force for drawing the paper from the cassette varied between 700 g and 400 g. The drawing force for shearing the locking member varied between 2000 and 4000 g.

The shearing of the locking member started after a torsional deformation of the weakened neck portion 29 over approximately 55 degrees.

Upon further rotation of the core, the neck 29 was broken off. The shearing of the locking member occurred smoothly but its completion was quite audible. The final rupturing of the locking member was accompanied by a "click". The length of paper pulled from the cassette amounted to about 50 mm. The portion 28 of the locking member may remain in the slot 26, but usually it will fall out of said slot to rest on the inner wall of the core.

The light-tightness of the cassette is not impaired by the slot 26. Light that enters through the opening between the periphery of the slot 26 and the end portion 28 of the locking member 25 is distributed within the core and is sufficiently weakened on its passage through the narrow annular space between the hub portions 16 and 17 and the core, before it reaches the ends of the roll of light-sensitive material, to be incapable of fogging the light-sensitive material.

The invention is not limited to the described embodiment. The shell portion of the cassette may have other forms than the rectanguloid one illustrated. For instance, the shell may have a circular cross section or a combination of a half circular with a half square form.

One end wall may be integrally formed with the shell, so that the cassette comprises one removable end cap only.

The locking member may be made of a material other than aluminum, e.g. a metal alloy, plastic or a fiber-bonded material, and may take a form that differs from the illustrations in FIGS. 4 and 5. The locking member may be made by moulding rather than by stamping as described.

The non-rotational co-operation of the locking member with a wall portion of the cassette may also occur otherwise than through a tongue and slot engagement. For instance, the wall 19 of the hub member 17 may be provided, on the side facing into the core, with two parallel ribs between which may fit an end portion of the locking member, such as the portion 28 of the member 25. The end edge of such end portion is in such case preferably straight, unlike the rounded edge 36 illustrated in FIG. 5. Suchlike configuration requires, it should be noted, a redesign of the moulds or tools for producing the end cap. The tubelike core, on the contrary, does not require any modification. A redesign for the end caps is not required in the cassette according to the embodiment disclosed hereinbefore, since the slots 26 may be cut in the caps after formation thereof.

What we claim is:

1. A cassette for holding and dispensing a roll of web material wound onto a tubelike core, said cassette comprising a container formed of a tubular shell and two fixed end walls having central hub portions, a tubelike core having a roll of web material wound thereon for rotation therewith, said core having rotatably supported within said container by said hub portions, the shell having a peripheral exit slot through which the web material can be unrolled from said roll, and a rigid locking member for preventing rotation of the core prior to the first use of the cassette, such member comprising two end portions connected by a weakened zone which is ruptured by the rotation of the core incidental to the initial withdrawal of the web material from the cassette, one of said end portions of said locking member being located within and engaged by the core of the roll, and the other end portion being engaged with the hub portion of one end wall of said container so as thereby to prevent rotation of the core, said weakened zone having across its width at least one inner sub-zone of substantially lower rupture resistance than the rupture resistance in each of the outer sub-zones on each side of said inner sub-zone, whereby the rupture resistance of said weakened zone varies across its width and said weakened zone ruptures with significantly lesser relative rotation between said core and hub than in the absence of said inner sub-zone.

2. A cassette according to claim 1, wherein in said weakened zone there is at least one aperture in the locking member which creates a said inner sub-zone of nil rupture resistance.

3. A cassette according to claim 1, wherein said weakened zone is a widthwise reduced zone of the locking member.

4. A cassette according to claim 1, wherein there is a said inner sub-zone having three or more boundary edges defining three or more corner angles.

5. A cassette according to claim 4, wherein there is a said inner sub-zone of diamond-like shape.

6. A cassette according to claim 1, wherein said locking member is formed in one piece.

7. A cassette according to claim 6, wherein said locking member has been stamped from sheet metal.

* * * * *